Feb. 6, 1940.   S. ZIEGLER   2,188,993
OIL SEPARATOR
Filed March 27, 1939
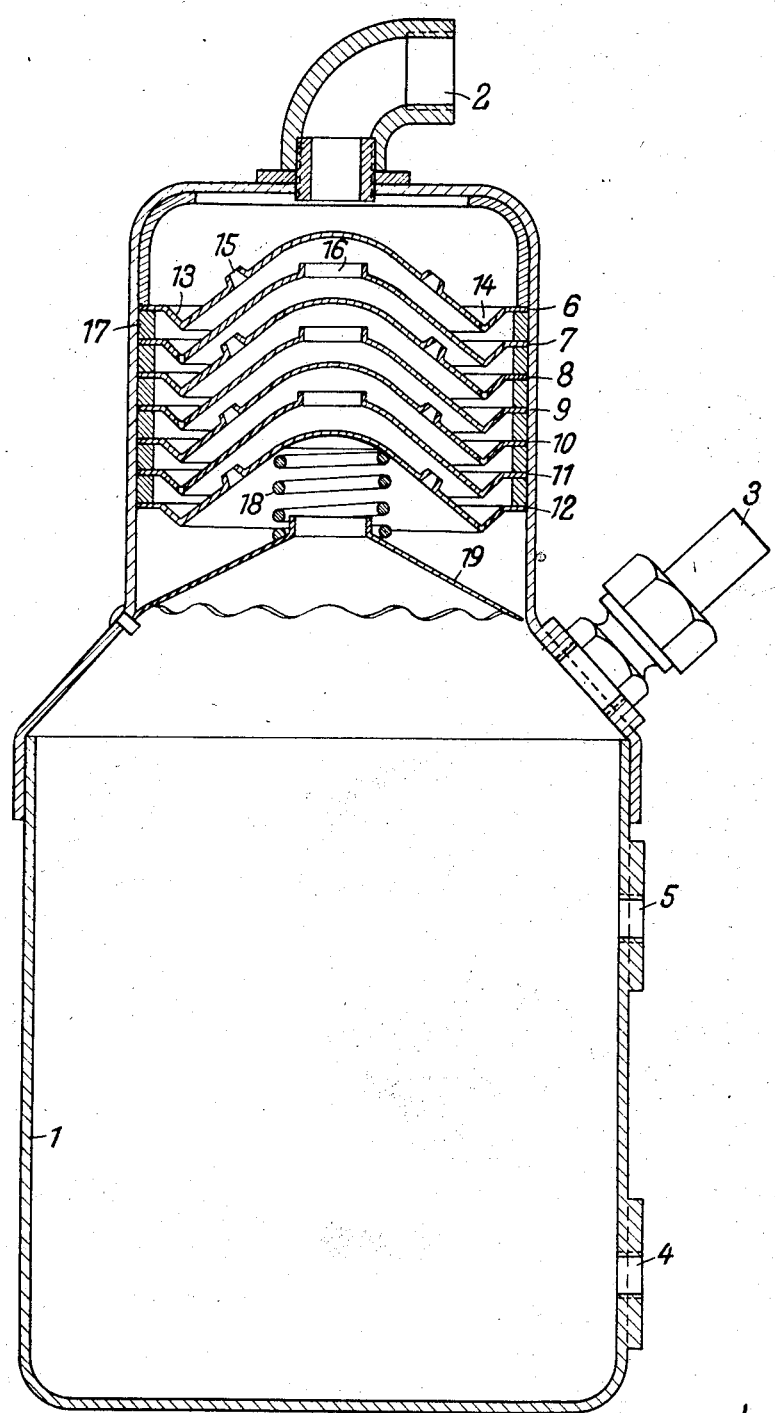
Inventor:
S. Ziegler Patented Feb. 6, 1940

2,188,993

UNITED STATES PATENT OFFICE 2,188,993

OIL SEPARATOR

Serge Ziegler, Berlin, Germany

Application March 27, 1939, Serial No. 264,416
In Germany July 14, 1934

11 Claims. (Cl. 183—105)

The invention relates to a device for separating oil from gases or vapours, particularly for separating lubricating oil from compressed air. Such devices are of great practical importance especially where compressors and the like are working continuously for when the lubricating oil is only incompletely separated from the compressed air, the working costs increase out of all proportion.

Devices of this kind are known, wherein the gases which are charged with liquid particles are passed with a constant change of direction over cone-shaped baffle plates arranged one above the other. However in these known devices the oil particles deposited upon the baffle plates continue to come into contact with the gas current so that they are partly retaken up thereby. It is among the objects of this invention to avoid this disadvantage.

According to the invention alternate baffle plates are provided with a central aperture bounded by a tubular flange extending in the direction against the flow of gas, while the remaining baffle plates are provided with a plurality of apertures each bounded by a flange extending in the direction against the flow of gas. Preferably, alternate baffle plates beginning with the second are provided with a central aperture while alternate baffle plates beginning with the first are provided with a plurality of apertures. Care must be taken to ensure that the oil particles deposited upon and flowing downwardly over the baffle plates are drawn away from the gas current. For this purpose the cone-shaped baffle plates are preferably in contact at their lower ends with the container wall, and further no apertures are provided in the lower portions of the baffle plates for the passage of the gas to be cleaned, so that grooves not reached by the gas current are formed at or adjacent the lower edge of the baffle plates for collecting the separated liquid particles. At the lowest point of each collecting groove drip apertures are arranged through which the separated oil drips into the collecting groove under the action of the gas passing from the top downwardly through the separator. The invention will now be described with reference to the accompanying drawing which illustrates a device according to the invention by way of example.

At the upper end of the container 1 is located the oil separating device. The gas to be cleaned enters at 2 and is evacuated through the exit opening 3 after repeated changes of its direction of flow through the oil-separating device in which the oil is deposited. The separated oil collects in the lower portion of the container 1 and is drawn off to the oil pump through the opening 4. A sight glass 5 allows the level of the liquid to be observed.

The oil separator proper, located in the upper portion of the container, consists of a number of cone-shaped baffle plates arranged one above the other and possessing at their lower end a gutter 13 having drip apertures 14 for collecting and evacuating the separated oil. Alternate baffle plates commencing with the second baffle plate (7, 9, 11) are provided with a centre opening 16 bounded by a tubular flange extending in the direction against the flow of gas. The remaining alternate baffle plates (6, 8, 10, 12) are provided with a plurality of apertures 15, bounded by frusto-conical flanges extending in the direction against the gas flow. These last mentioned apertures may be distributed over a substantial part of the surface of the baffle plate or arranged in a circle as illustrated on the drawing, the said circle being drawn at a relatively great distance from the central aperture of the baffle plate immediately above. However, the apertures 15 do not extend to the lower portion of the baffle plates so that a "dead" space is created which is not reached by the gas current, said space acting as a channel for collecting the separated oil. The individual baffle plates are removably inserted alternately with spacing washers 17 in the upper portion of the container and are pressed firmly against each other by means of a spring 18. The spring abuts upon a cone-shaped closing plate 19 arranged below the lowermost baffle plate and extending to adjacent the wall of the container, along which it guides the oil dripping from the lowermost collecting channel.

The gas current entering at 2 first impinges upon the flattened top of the cone-shaped baffle plate 6 and then flows through the various small apertures 15 adjacent the lowermost collecting channel into the hollow space between the first and second baffle plates. Here the gas again collects and passes through the central aperture 16 in the second baffle plate on to the flattened top of the cone-shaped third baffle plate 8. The oil particles deposited by the gas impinges upon the plates gradually flow downwardly over the surface of the plates and collect in the channels 13, whence they drip from plate to plate through the drip apertures 14 provided in the said channels until they finally reach the cone-shaped closing plate 19 by means of which latter the oil particles are conveyed to the wall of the container 1.

When using the new device for separating lubricating oil from compressed air, almost the entire quantity of the valuable lubricating oil is recovered even at a high rate of gas flow. The separated oil is collected in the lower portion of the container 1. Owing to the partial vacuum above the oil, the collecting container acts at the same time as a pressure equalising device.

It is to be understood that although the following claims relate to a device for separating oil from gases and specially for separating lubricating oil from compressed air, the invention is applicable to the separation of liquids other than oil from gases or vapours other than compressed air.

What I claim and desire to secure by Letters Patent of the United States is:

1. A device for separating oil from gases comprising a casing provided with an inlet for the gases to be cleaned and an outlet for the cleaned gases, and a plurality of cone-shaped baffle plates arranged one above the other with the apex of each baffle plate pointing against the flow of gas, each alternate plate being formed with a central aperture bounded by a flange extending in the direction opposite to the direction of flow of the gases while each remaining alternate plate is formed with a plurality of apertures otherwise than centrally, said apertures also being bounded by flanges extending in the direction opposite to the direction of flow of the gas, said plates being adapted to convey the particles of oil deposited thereon away from the gas current.

2. A device for separating oil from gases, comprising a casing provided with an inlet for the gases to be cleaned and an outlet for the cleaned gases, and a plurality of cone-shaped baffle plates arranged one above the other in the upper part of said casing with the apex of each baffle plate pointing against the flow of gas, each alternate plate being formed with a central aperture bounded by a tubular flange extending in the direction opposite to the direction of flow of the gases, while the remaining alternate plates are formed with a plurality of apertures otherwise than centrally, said apertures being bounded by frustro-conical flanges extending in the direction opposite to the direction of flow of the gas, said plates being adapted to convey the particles of oil deposited thereon away from the gas current.

3. A device for separating oil from gases comprising a casing provided with an inlet for the gases to be cleaned and an outlet for the cleaned gases and a plurality of cone-shaped baffle plates arranged one above the other in the upper part of said casing with the apex of each baffle plate pointing against the flow of gas, each alternate plate starting with the second being formed with a central aperture bounded by a flange extending in the direction opposite to the direction of flow of the gases, while the remaining alternate plates starting with the first are formed with a plurality of apertures otherwise than centrally, said apertures also being bounded by flanges extending in the direction opposite to the direction of flow of the gas, said plates being adapted to convey the particles of oil deposited thereon away from the gas current.

4. A device for separating oil from gases, comprising a casing provided with an inlet and outlet for the gases, and a plurality of cone-shaped baffle plates arranged one above the other with the apex of each baffle plate pointing against the flow of gas, each alternate plate starting with the second being formed with a central aperture bounded by a flange extending in the direction opposite to the direction of the gas flow, while each of the remaining alternate plates is formed with a plurality of apertures otherwise than centrally, said apertures being bounded by frustro-conical flanges extending in the direction opposite to the direction of the gas flow, said plates being in contact with the wall of the casing at their edges, there being channels adjacent said wall to collect the particles of oil deposited on the plates.

5. A device for separating oil from gases comprising a container provided with an inlet and an outlet for the gases and a plurality of cone-shaped baffle plates mounted one above the other in the upper part of said container with the apex of each baffle plate pointing against the flow of gas, each alternate plate beginning with the second being provided with a tubular flange extending in the direction opposite to the direction of gas flow while each remaining alternate plate is provided with a plurality of apertures otherwise than centrally and otherwise than in the lower part thereof and bounded by frustro-conical flanges extending in the direction opposite to the direction of gas flow, said plates having outwardly and upwardly extending flanges at the edges thereof, the outer edges of said flanges being in contact with the side wall of the container whereby channels are formed for collecting the particles of oil deposited on the plates.

6. A device for separating oil from gases comprising a container provided with an inlet and an outlet for the gases and a plurality of cone-shaped baffle plates mounted one above the other in the upper part of said container with the apex of each baffle plate pointing against the flow of gas, each alternate plate beginning with the second being provided with a tubular flange extending in the direction opposite to the direction of gas flow while each remaining alternate plate is provided with a plurality of apertures otherwise than centrally and otherwise than in the lower part thereof and bounded by frustro-conical flanges extending in the direction opposite to the direction of gas flow, said plates having outwardly and upwardly extending flanges at the edges thereof, the outer edges of said flanges being in contact with the side wall of the container, whereby channels are formed for collecting the particles of oil deposited on the plates, said collecting channels being provided with drip apertures at the lowermost point thereof.

7. A device for separating oil from gases comprising a container provided with an inlet for the gases to be cleaned in the upper part thereof, an outlet for the cleaned gases and a plurality of cone-shaped baffle plates mounted one above the other in the upper part of said container with the apex of each baffle plate pointing against the flow of gas, each alternate plate beginning with the second being provided with a tubular flange extending in the direction opposite to the direction of gas flow while each remaining alternate plate is provided with a plurality of apertures otherwise than centrally and otherwise than in the lower part thereof and bounded by flanges extending in the direction opposite to the direction of gas flow, said plates having outward and upwardly extending flanges at the edges thereof, the outer edges of said flanges being in contact with the side wall of the container, whereby channels are formed for collecting the particles of oil deposited on the plates, said collecting channels being provided with drip apertures at the lowermost point thereof.

8. A device for separating oil from gases comprising a container provided with an inlet and an outlet for the gases, a series of cone-shaped baffle plates mounted within said container in the upper part thereof with the apex of each baffle plate pointing against the flow of gas, each alternate baffle plate beginning with the second being provided with a central aperture bounded by a flange extending in the direction opposite to the direction of the gas flow, while each remaining alternate plate is provided with a plurality of apertures otherwise than centrally and bounded by flanges extending in the direction opposite to the direction of gas flow, said plates being in contact at their outside edges with the inside wall of the container whereby channels are formed within which the particles of oil deposited on the plates collect, said channels being provided with drip apertures at the lowermost point thereof, and a cone-shaped closing plate disposed beneath said plates and adapted to convey the oil dripping from the lowermost baffle plate to the lower part of the container.

9. A device for separating oil from gases which comprises a container provided with an inlet for the gases at the top thereof, and an outlet for the treated gases, a series of cone-shaped baffle plates mounted with the apex of each baffle plate pointing against the flow of gas, each alternate plate being provided with a central aperture bounded by a tubular flange extending in the direction opposite to the direction of flow of the gas while each of the remaining alternate plates is provided with a plurality of apertures otherwise than centrally and bounded by flanges extending in a direction opposite to the direction of flow of the gas, said plates being adapted to convey the oil particles deposited thereon to the plate next in position below and means for conveying the oil dripping from the lowermost plate to the lower part of the container, said lower part of the container acting as oil collector and air chamber.

10. A device for separating oil from gases comprising a container provided with an inlet and outlet for the gases, and a plurality of cone-shaped baffle plates removably mounted one above the other in the upper part of said container with the apex of each baffle plate pointing against the flow of gas, each alternate plate starting with the second being provided with a central aperture bounded by a tubular flange extending in the direction opposite to the direction of flow of the gas while each remaining alternate plate is provided with a plurality of apertures bounded by frustro-conical flanges extending in the direction opposite to the direction of flow of the gas, means for maintaining the plates in position in the upper part of the container, said plates being adapted to convey the oil deposited thereon to the lower portion of the container.

11. A device for separating oil from gases comprising a container provided with an inlet at the top of said container and an outlet for the gases, a plurality of cone-shaped baffle plates disposed in the upper part of said container immediately below the inlet and in contact at their edge with the side wall of the container, there being channels adjacent said wall within which the oil deposited on said plates collects, each alternate plate starting with the second being provided with a central aperture bounded by a tubular flange extending in the direction opposite to the direction of gas flow while each remaining alternate plate is provided with a plurality of apertures otherwise than centrally and otherwise than in the lower part thereof, said apertures being bounded by frustro-conical flanges extending in the direction opposite the direction of gas flow, spacing members disposed between each pair of plates, compression means adapted to press said plates and closing members against an abutment in the upper part of said container and supported upon a conical closing plate disposed below said plates, said closing plate conducting the oil dripping from apertures in the channels formed between said plates and the side wall of the container to the lower part of the container.

SERGE ZIEGLER.